No. 852,024. PATENTED APR. 30, 1907.
G. J. MASHEK.
APPARATUS FOR PREPARING PULVERULENT MATERIALS FOR MOLDING OR BRIQUETING.
APPLICATION FILED JULY 3, 1906.
3 SHEETS—SHEET 1.
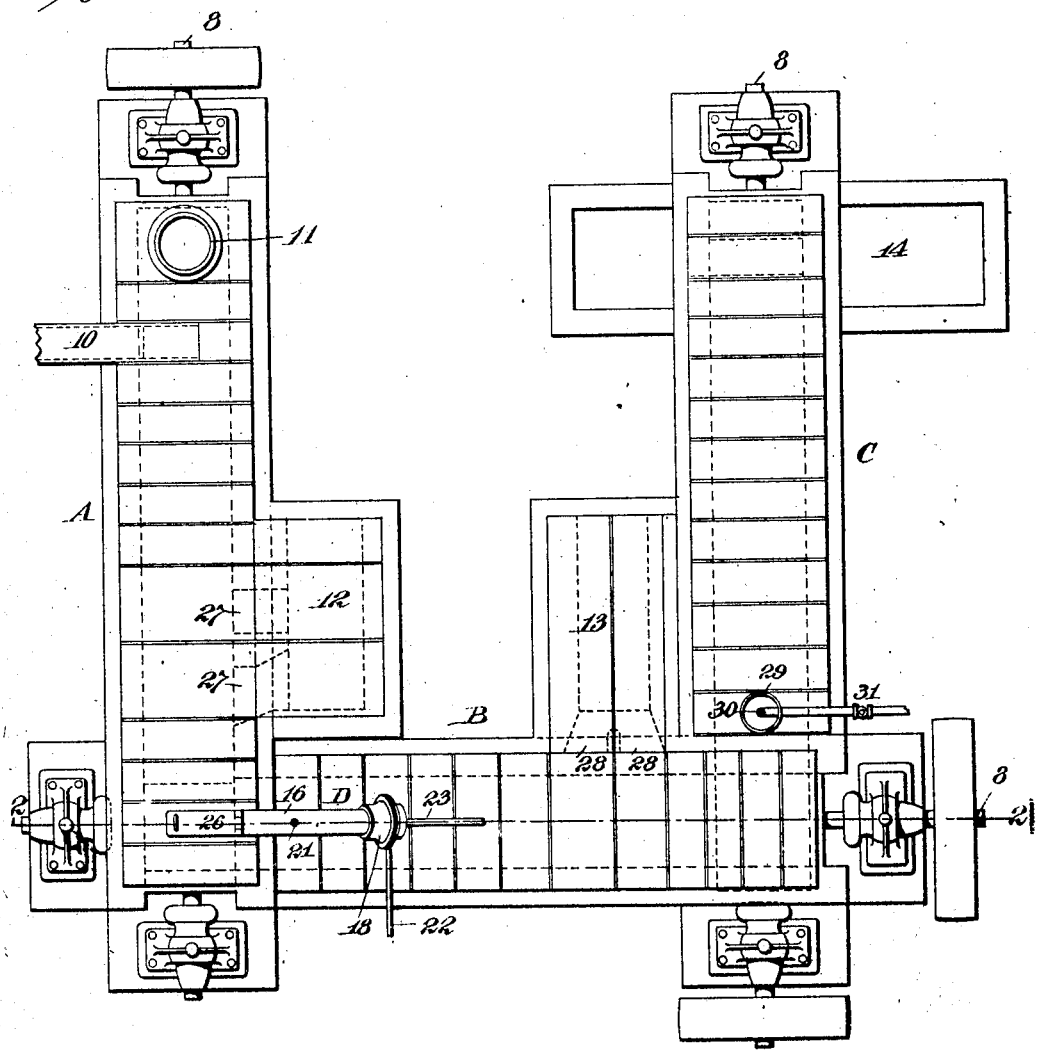

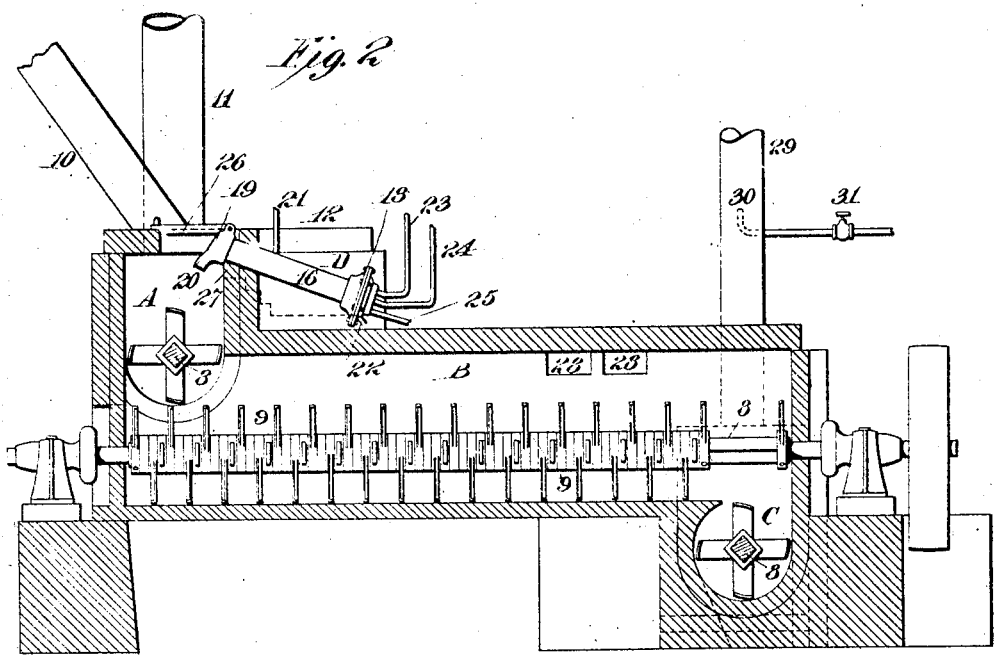
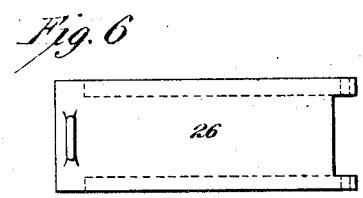
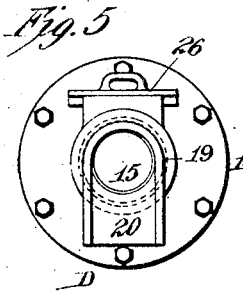
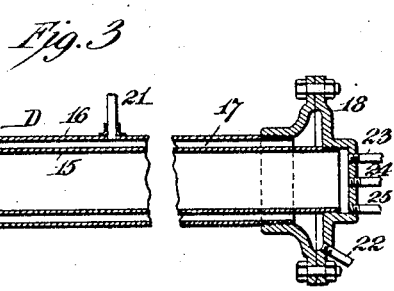
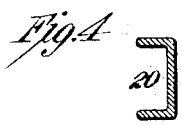

No. 852,024. PATENTED APR. 30, 1907.
G. J. MASHEK.
APPARATUS FOR PREPARING PULVERULENT MATERIALS FOR MOLDING OR BRIQUETING.
APPLICATION FILED JULY 3, 1906.
3 SHEETS—SHEET 1.
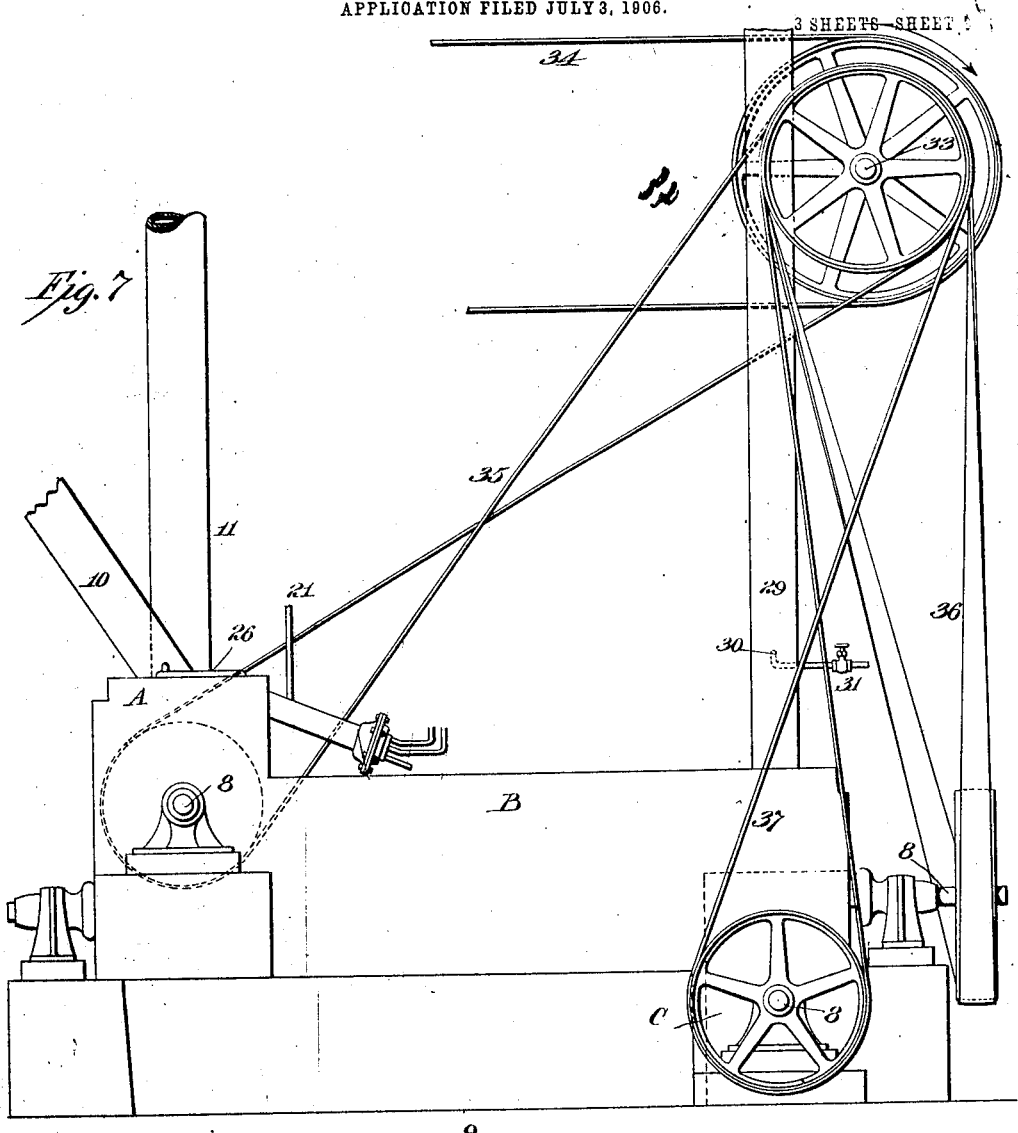
Witnesses: 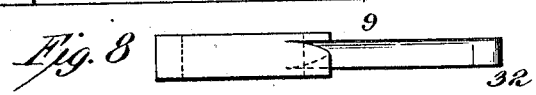
Inventor 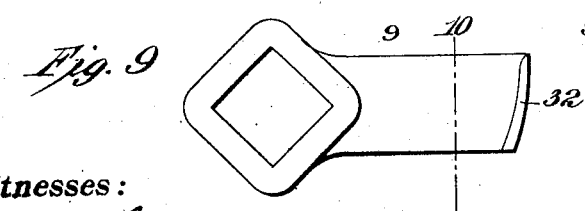
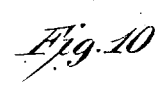
Attorneys.

UNITED STATES PATENT OFFICE.

GEORGE J. MASHEK, OF NEWARK, NEW JERSEY.

APPARATUS FOR PREPARING PULVERULENT MATERIALS FOR MOLDING OR BRIQUETING.

No. 852,024. Specification of Letters Patent. Patented April 30, 1907.

Application filed July 3, 1906. Serial No. 324,623.

*To all whom it may concern:*

Be it known that I, GEORGE J. MASHEK, a citizen of the United States, residing at Newark, in the county of Essex and State of New Jersey, have invented a certain new and useful Improvement in Apparatus for Preparing Pulverulent Materials for Molding or Briqueting, of which the following is a description.

The object I have in view is to produce a simple and effective apparatus for preparing loose, crushed or pulverized material, such as fuel or mineral dust, for molding or briqueting, and particularly for suitably drying the material, for mixing the binder with the dried and warm product, and for then cooling and finishing the material to the condition where it can be most effectively handled in molding and briqueting machines.

The apparatus is designed to carry out the process invented by me, which process is made the subject of a contemporaneous application for patent (Serial No. 324,624 filed July 3, 1906).

In the accompanying drawing, Figure 1 is a plan view of the apparatus; Fig. 2 is a vertical section on the line 2—2 in Fig. 1; Fig. 3 is a longitudinal section of the "foamer" for diluting and discharging the pitch; Fig. 4 is a cross-section on the line 4—4 in Fig. 3; Fig. 5 is an end elevation of the discharge end of the foamer; Fig. 6 is a plan view of the door for closing the top of the apparatus above the foamer; Fig. 7 is an elevation of the apparatus showing a means for driving the shafts of the several chambers; Figs. 8 and 9 are, respectively, an edge view and a side view of one of the shaft blades; and Fig. 10 is a cross-section on line 10—10 in Fig. 9.

The apparatus consists of a number of horizontally arranged chambers placed so that one discharges into the other, the chambers being located successively in the direction of the flow of the material at lower elevations, so that one discharges into the other by gravity, leaving no dead spaces for the material to lodge in. Three of these chambers are shown in the drawings. This number can be increased or decreased depending on the moisture in the material to be briqueted, the greater the moisture, the greater the number of chambers required to thoroughly dry the pulverulent material, since in order to use pitch as a binder economically, the material must first be thoroughly dried before the pitch is applied, as even a small percentage of moisture remaining in the material will prevent the pitch from properly adhering to the particles.

The three chambers A, B and C are shown as arranged as three sides of a square in order to save floor space, although they may be arranged in any other way so long as they are successively at lower elevations. The construction of these chambers is practically alike. They are horizontally arranged chambers having rounded bottoms, and are built either of sheet steel supported by angle iron, or sheet steel lined with brick, or entirely of brick. A little below the center of each chamber a shaft 8 is run longitudinally through it. This shaft projects beyond the end walls of the chamber and is supported by bearings outside of the end walls, and has a pulley or other suitable means for applying power to it. On the shaft within each chamber are mounted radially a number of blades 9, which have a slight pitch so as to feed the material forward. Each blade is also preferably provided with a small lip 32 (Fig. 9) on its outer end. 10 is a feed spout for feeding the pulverulent material into the top of the chamber A near its outer end, while 11 is a stack rising from the top of the chamber A at its outer end for carrying off the hot gases used in drying the material. Near the inner end of the chamber A is a furnace 12, which delivers its products of combustion through flues 27 (shown in dotted lines in Fig. 1) to one side of the chamber A near its top wall and well above the blade-carrying shaft. Another heating furnace 13 is connected by flues 28 with the chamber B near its discharge end for a purpose which will be presently explained. The chamber A is placed at a sufficiently higher elevation than the chamber B so that the former discharges into the latter at their connecting ends, as illustrated in Fig. 2, and likewise the chamber B is located above and discharges by gravity into the chamber C, as shown in Fig. 2. The chamber C at its discharge end discharges into an elevator pit 14 or is connected with any suitable form of conveyer for conveying the material to the molding or briqueting machines. At the inner end of the chamber C is a stack or air pipe 29, provided with a steam jet 30 pointing toward its outlet. This steam jet is regulated by a valve 31, that so a regulated outward draft can be produced in the stack 29 for drawing air through the chamber C from the pit 14.

At the intersection of the chambers A and B is located the foamer or diluting apparatus D for diluting the pitch and discharging it into the receiving end of the chamber B. This apparatus is constructed of two concentric pipes 15, 16 placed one within the other and leaving between them a steam space 17. At the receiving end of the foamer a two-part head 18 is provided, having screw connections with the inner and outer pipes 15, 16, forming an expansion flange for taking up any unequal expansion in the apparatus. At the discharge end of the foamer the two pipes are screwed into a discharging head 19 which closes the space between the pipes and provides a spout 20 for guiding the pitch in its discharge from the foamer. Connected with the outer pipe 16 of the foamer so as to deliver superheated steam into the space 17 is a steam pipe 21 for maintaining the pitch in the foamer at the proper temperature. A drip pipe 22 for the water of condensation in the space 17 is connected with the head 18. The head 18 is also provided with pipes 23 and 24, through which the pitch and water are respectively delivered to the foamer. A drain pipe 25 is also connected with the head 18 to draw off the pitch from the foamer when the apparatus is not in operation, so as to prevent the pitch from solidifying when the steam is shut off. The foamer is set at an angle, as illustrated in Fig. 2, its discharging end being higher than its receiving end. A cast iron door 26 is employed for closing the opening above the discharge end of the foamer, and this door may be conveniently hinged upon the head 19 of the foamer.

The operation of the apparatus is as follows: The pulverulent material is fed continuously in a regulated quantity through the spout 10 into the receiving end of the heating and drying chamber A. The shaft of this chamber is driven at a sufficiently high velocity to keep the pulverulent material with its particles in a separated condition as it passes through the chamber. With blades of the construction described having a radius of twelve inches, a speed of about 180 revolutions per minute is sufficient to produce this result. The material is lifted by the rotation of the blades at this high speed, is thrown up against the roof or cover of the chamber, and is showered downwardly again to the bottom of the chamber. At the same time the material is advanced slowly from the feed hopper to the discharge end of the chamber. The hot gases of combustion from the furnace 12 entering the chamber near its discharging end, pass through the showered and separated material in a direction opposite to the flow of that material through the chamber. These gases take up the moisture from the material, drying and heating it, and escape through the stack 11.

The material is delivered in a thoroughly dried and heated condition at the discharging end of the drying and heating chamber A into the receiving end of the mixing chamber B. At this point the binder, preferably in the form of diluted coal-tar or asphaltum pitch, is added to the material. The pitch is in a heated and highly fluid condition, and is fed continuously through the pipe 23 to the foamer D in regulated quantities, the necessary amount of water being fed continuously to the pitch through the pipe 24. By reason of the heat furnished by the steam supplied through the pipe 21 to the shell of the foamer, the pitch is maintained in a heated and liquid condition, and in this condition the water unites and thoroughly mixes with it, making a large volume of foam of diluted pitch, which rapidly rises and is discharged over the spout at the upper end of the foamer, falling upon the dried and heated pulverulent material in the bottom of the mixer B at its receiving end. The shaft in the mixer B is run at a lower speed than that of the drier A, so that the blades will not throw the material to the top of the mixer, but will mix the binder thoroughly with the pulverulent material by the stirring action of the blades upon the material in the bottom of the mixing chamber. With blades having a radius of twelve inches, a suitable speed for the shaft of the mixer B will be about 140 revolutions per minute. The furnace 13 connected with the mixer B will be operated when the apparatus is started, so as to heat the mixer B up to the same temperature as the material which is delivered to it from the drier A. After this condition has been reached, the furnace 13 may be entirely shut off, the heat from the pulverulent material being sufficient to maintain the temperature in the mixer B, or the furnace 13 can be fired just sufficiently to maintain the temperature. The hot gases from the furnace 13 pass through the mixer B into the drier A, and through the drier into the stack 11 with the gases from the furnace 12.

The material is delivered by the mixer B to the cooling chamber C. At this time the temperature of the material may be and usually is slightly higher than is desirable for making a good briquet, the pitch being too liquid; but by running the material through the cooler C, it will be slightly cooled, so as to bring the pitch to the plastic point or to the temperature most suitable for the press. For this purpose it is desirable that the blades in the cooler C should have a somewhat higher speed than those of the mixer B so as to toss and shower the material sufficiently to produce this cooling effect. With blades of the radius specified, a speed of about 165 revolutions per minute has been found suitable for the shaft of the cooler C. The steam jet 30 in the stack 29 will be regulated so as to produce sufficient draft in the stack to draw the required amount of air through the chamber C to produce the proper cooling effect.

A convenient manner of driving the three shafts of the apparatus so as to maintain their proper relative speeds is shown in Fig. 7. The shaft 33 is driven by the prime mover by means of the belt 34, and from pulleys on the shaft 33 belts 35, 36 and 37, extend to pulleys on the ends of the shafts of the chambers A, B and C, respectively, these pulleys being so proportioned that with the required speed of the shaft 33 the shafts of the chambers A, B and C, will be given the speeds of rotation before stated.

The drying, mixing and cooling chambers can be arranged in any convenient or suitable way to economize floor space, and their construction may be varied from that illustrated in the drawings. Experience has shown that as many as six chambers in a series can be used to advantage on very wet material. Three chambers is the minimum number that should be employed, although fair results have been obtained by the use of only two chambers, one for drying the pulverulent material and one for mixing the binder therewith. When the material is very wet, additional furnaces may be added to the drying chamber or chambers, in all of which the shafts will be run at a high speed so as to shower the material and subject its particles in a separated condition to the action of the drying gases.

The operation of the apparatus is continuous and practically automatic, and has been found to be highly efficient, practically all the heat from the products of combustion being utilized.

What I claim is:

1. In apparatus for preparing pulverulent materials for molding or briqueting, the combination of a drying chamber, means for showering the pulverulent material in such drying chamber whereby the pulverulent material will be maintained with its particles in a separated condition in such drying chamber, means for passing heating and drying gases through such drying chamber in contact with such separated particles, a mixing chamber receiving the heated and dried material from the drying chamber, means for delivering a binder to the material in the mixing chamber, and means in said mixing chamber for mixing the binder with the heated and dried material, substantially as set forth.

2. In apparatus for preparing pulverulent materials for molding or briqueting, the combination of a drying chamber, means for showering the pulverulent material in such drying chamber whereby the pulverulent material will be maintained with its particles in a separated condition in such drying chamber, means for passing heating and drying gases through such drying chamber in contact with such separated particles, a mixing chamber receiving the heated and dried material from the drying chamber, means for delivering a binder to the material in the mixing chamber, and rotating stirrers for stirring the binder into the heated and dried pulverulent material in the mixing chamber, substantially as set forth.

3. In apparatus for preparing pulverulent materials for molding or briqueting, the combination of horizontally arranged drying and mixing chambers connected in succession, rotating shafts passing longitudinally through said chambers and carrying blades for acting upon the material, and means for rotating such shafts at different speeds, so as to shower the material in the drying chamber but not in the mixing chamber, substantially as set forth.

4. In apparatus for preparing pulverulent materials for molding or briqueting, the combination of horizontally arranged drying and mixing chambers connected in succession, rotating shafts running longitudinally through both said chambers and carrying blades for acting upon the material, means for rotating such shafts at different speeds so as to shower the material in the drying chamber but not in the mixing chamber, and a furnace for delivering heating and drying gases to the drying chamber, substantially as set forth.

5. In apparatus for preparing pulverulent materials for molding or briqueting, the combination of horizontally arranged drying and mixing chambers connected in succession, rotating shafts running longitudinally through both said chambers and carrying blades for acting upon the material, means for rotating such shafts at different speeds so as to shower the material in the drying chamber but not in the mixing chamber, a furnace for delivering heating and drying gases to the drying chamber, and a furnace for delivering heating gases to the mixing chamber for maintaining the temperature of the latter chamber, substantially as set forth.

6. In apparatus for preparing pulverulent materials for molding or briqueting, the combination of drying, mixing and cooling chambers, means for feeding the material through these chambers in succession, means for delivering heating and drying gases to the drying chamber, means for feeding a binder to the mixing chamber, and means for drawing air through the cooling chamber, substantially as set forth.

7. In apparatus for preparing pulverulent materials for molding or briqueting, the combination of a drying chamber, means for maintaining the pulverulent material with its particles in a separated condition in such drying chamber, means for passing heating and drying gases through said drying chamber, a mixing chamber receiving the heated and dried material from the drying chamber; means for delivering a binder to the material in the mixing chamber, means in said mixing chamber for mixing the binder with the heated and dried material, a cooling chamber receiving the material from the mixing chamber, and means for drawing air through the cooling chamber, substantially as set forth.

8. In apparatus for preparing pulverulent materials for molding or briqueting, the combination of horizontally arranged drying, mixing and cooling chambers connected in succession, rotating shafts passing longitudinally through these chambers and carrying stirring and feeding blades, and means for driving the blades in the mixing chamber at a lower speed than the blades in the drying chamber, substantially as set forth.

9. In apparatus for preparing pulverulent materials for molding or briqueting, the combination of horizontally arranged drying, mixing and cooling chambers connected in succession, rotating shafts passing longitudinally through these chambers and carrying stirring and feeding blades, and means for driving the blades in the mixing chamber at a lower speed than the blades in the drying and cooling chambers, substantially as set forth.

10. In apparatus for preparing pulverulent materials for molding or briqueting, the combination of horizontal drying, mixing and cooling chambers located at successively lower elevations and discharging directly one into another, means for feeding the material through these chambers successively, means for supplying heating and drying gases to the drying chamber, means for supplying a binder to the mixing chamber, and means for supplying a cooling medium to the cooling chamber; substantially as set forth.

11. In apparatus for preparing pulverulent materials for molding or briqueting, the combination with a mixer in which the pulverulent material and binder are mixed, of means for producing pitchfoam and means for delivering the pitchfoam to such mixer, substantially as set forth.

12. In apparatus for preparing pulverulent materials for molding or briqueting, the combination with a mixer in which the pulverulent material and binder are mixed, of a pitchfoamer comprising a chamber, means for delivering pitch and water to said chamber and means for maintaining said chamber in a heated condition so as to cause the pitch and water to unite and form pitchfoam; and means for delivering the pitchfoam to such mixer, substantially as set forth.

13. In apparatus for preparing pulverulent materials for molding or briqueting, a pitch foamer having in combination a chamber, a steam jacket surrounding said chamber, means for delivering melted pitch and water to the bottom of said chamber, and an opening for discharging pitch foam at the top of said chamber, substantially as set forth.

14. In apparatus for preparing pulverulent materials for molding or briqueting, a pitch foamer having in combination concentric pipes forming a jacketed chamber, an expansion flange connecting such pipes together at one end, a rigid connection between such pipes at the other end, a pipe for supplying steam to the steam jacket, pipes for supplying melted pitch and water to the central chamber, a drip pipe for the steam jacket, and a draw-off cock for drawing off the pitch from the central chamber, substantially as set forth.

This specification signed and witnessed this 27th day of June, 1906.

GEORGE J. MASHEK.

Witnesses:
 JNO. ROB'T TAYLOR,
 AUG. LONG.